United States Patent Office 3,719,259
Patented Mar. 6, 1973

3,719,259
CLUTCH WITH TORQUE RESPONSIVE VALVE
Lawrence D. Burcz and George E. Lemieux, Livonia, Mich., assignors to Ford Motor Company, Dearborn, Mich.
Filed Nov. 12, 1971, Ser. No. 198,295
Int. Cl. F16d 43/20
U.S. Cl. 192—54
8 Claims

ABSTRACT OF THE DISCLOSURE

A power transmission mechanism having multiple ratio gearing and clutches and brakes for controlling the relative motion of the elements of the gearing, including a torque input clutch for establishing and disestablishing a driving connection between a driving shaft and a power input element of the gearing, the driving connection between the driving shaft and the torque input member of the clutch including a reaction piston cooperating with an annular cylinder in the clutch structure and a cammed connection between the torque input shaft and the input member of the clutch including registering cam parts on said piston and on said clutch member whereby the torque transmitted through the clutch results in an axial force component on the piston, and valve means responsive to the relative angular displacement of the torque input shaft with respect to the clutch input member for establishing a pressure signal that is distributed to one side of the reaction piston which tends to oppose relative displacement of the torque input shaft with respect to the clutch input member.

GENERAL DESCRIPTION OF THE INVENTION

Our invention is adapted to be used in automatic power transmission mechanisms for automotive vehicles having internal combustion engines. It is adapted especially to be used in a friction clutch mechanism that is adapted to establish and disestablish a driving connection between an engine-driven shaft and a power input gear element of a multiple ratio gear system, the output element for which is connected through a drive shaft and a differential-and-axle assembly to the vehicle traction wheels. Selectively engageable friction brakes are employed to establish reaction points for the gear elements.

It is conventional practice in transmission mechanisms for automotive vehicles to provide fluid pressure-operated servos for engaging and disengaging the clutches and brakes for the transmission. The pressure source for the servos is a positive displacement pump driven by the engine. A valve circuit including a passage structure connects the high pressure side of the pump to the servos. Shift valve elements in the passage structure are adapted to distribute selectively pressure to the servos to initiate speed ratio changes. The valve elements respond to speed signals obtained from a speed governor mechanism drivably connected to the power output shaft of the transmission and to an engine torque signal.

The torque signal usually is produced by a valve that comprises a movable vacuum diaphragm assembly in communication with the engine intake manifold. A throttle valve mechanism that communicates with the high pressure portion of the circuit is actuated by the diaphragm assembly so that the control pressure supplied to the throttle valve is modulated to produce a resultant signal that is dependent upon engine intake manifold pressure. This is used in arrangements of this type as an indicator of engine torque. The torque signal is distributed to the transmission ratio shift controlling valve elements as well as to the main pressure regulator for maintaining a control pressure in the valve circuit that is related in magnitude to the torque delivered to the transmission.

If the engine includes certain engine exhaust gas controls, such as an exhaust gas recirculation system for reducing undesirable exhaust emissions, the engine intake manifold pressure cannot be used as an accurate indicator of engine torque. It becomes necessary, therefore, to obtain a torque signal that is independent of engine manifold pressure.

The improvement of our invention includes a torque sensor that is sensitive to the torque input for the transmission mechanism, and it includes torque transfer elements that form a part of the torque delivery path itself so that a direct torque reading can be obtained. Our improved sensor is capable of establishing a pressure signal that is directly, rather than remotely as in prior art systems, to the actual torque delivered to the input elements of the gearing.

Our improved torque sensor comprises a transmission throttle valve having relatively rotatable valve parts, each of which is formed with a valve orifice. The registry of the orifice changes as the angular disposition of one valve part with respect to the other is changed. One valve part is connected to the torque output side of the torque input clutch and the other valve member is connected to a torque input shaft. The reaction piston, which includes a first cam element, is disposed in adjacent disposition with respect to a torque input cam on the torque input shaft and a second registering cam element on the torque input element of the clutch. As torque is transmitted through the registering cam elements, an axial reaction force is imposed on the piston. Displacement of the piston is accompanied by relative rotation of the valve parts, thereby producing a modulated output pressure that is distributed to a reaction piston thereby imposing on the latter a reaction force that resists relative displacement of the valve parts. The magnitude of the pressure developed then is an indicator of the actual torque being delivered through the clutch. This pressure signal then can be used by the control circuit to actuate the ratio shift valve elements and to modify the pressure regulating characteristics of the main regulator valve. More reliable ratio shift control then can be achieved, and overall operating performance of the transmission mechanism, including ratio shift quality, is improved.

PARTICULAR DESCRIPTION OF THE INVENTION

Figure 1:
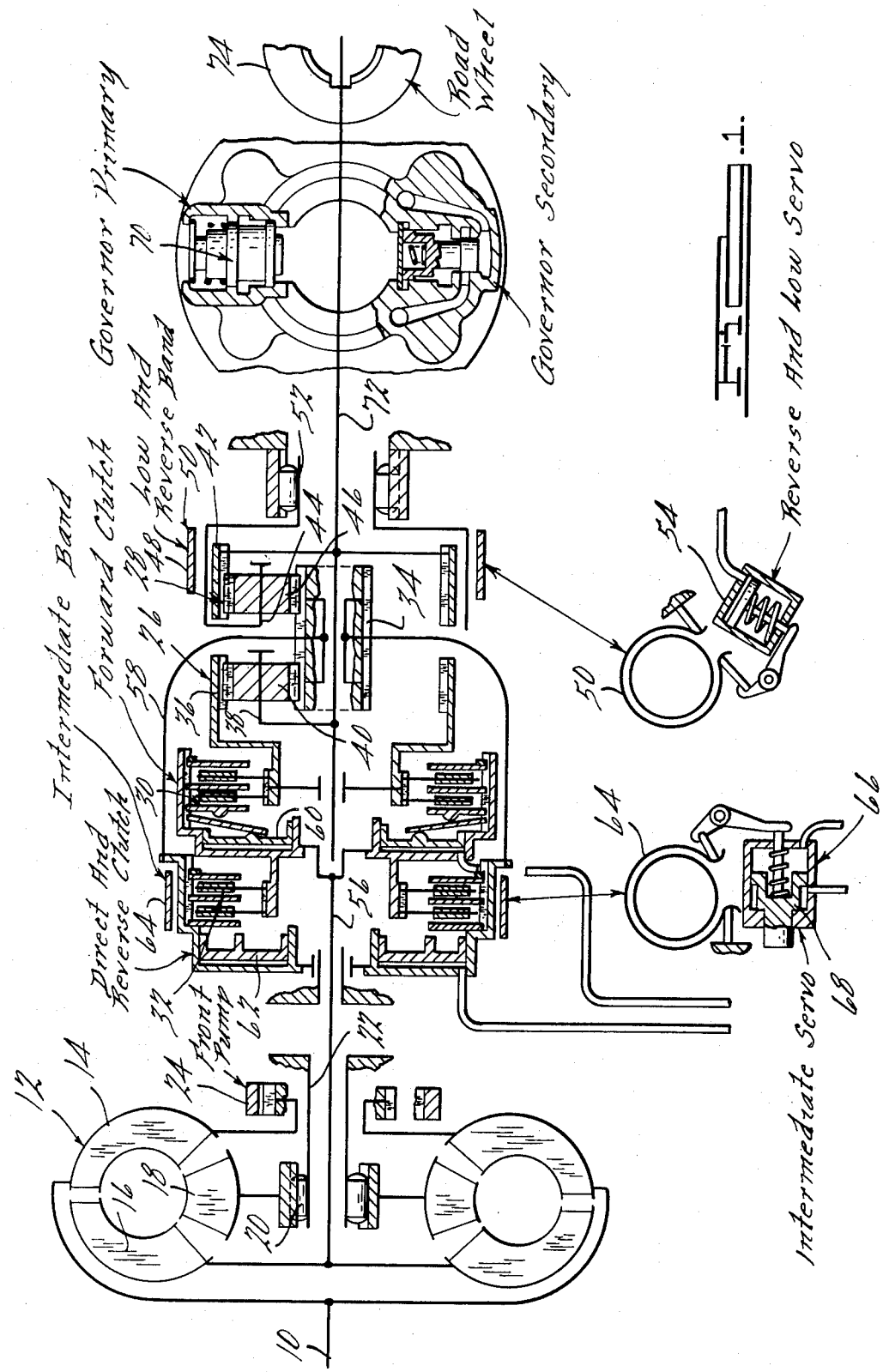
FIG. 1 shows in schematic form a transmission gearing assembly including friction clutches adapted to incorporate the improved torque sensor of our invention.

In FIG. 1 reference character 10 designates one end of the crankshaft of an internal combustion engine, not shown. Numeral 12 designates a hydrokinetic torque converter having a bladed impeller 14, a bladed turbine 16 and a bladed stator 18. The impeller, turbine and stator are arranged in toroidal fluid flow relationship in the usual fashion. An overrunning brake 20 prevents rotation of the stator during operation of the converter in the torque conversion range thereby transferring stator reaction torque to a stationary sleeve shaft 22, which is connected to the stationary transmission housing. A positive displacement pump 24 is connected drivably to the impeller so that it is driven by the engine crankshaft 10.

The gearing for the transmission mechanism includes a first simple planetary gear unit 26, a second simple planetary gear unit 28, a forward drive clutch 30 and a direct-and-reverse clutch 32.

Gear unit 26 includes a sun gear 34, a ring gear 36, a carrier 38 and planet pinions 40 journalled for rotation in meshing engagement with the ring gear 36 and the sun gear 34. Sun gear 34 is common to gear unit 28, which includes also ring gear 42, carrier 44 and planet pinions 46 journalled for rotation on the carrier 44 in meshing engagement with ring gear 42 and sun gear 34. Carrier 44 defines or is formed integrally with brake drum 48 about which is positioned a low-and-reverse brake band 50. Carrier 44 is adapted to be anchored to the transmission housing through an overrunning brake 52 which is effective to transfer reaction torque to the housing whenever the transmission mechanism is conditioned for low speed operation in the automatic drive range. Brake band 50 is applied when the transmission mechanism is conditioned for operation continuously in the low speed ratio and it is effective to establish a hill braking condition during which the direction of the reaction torque is reversed. The brake band is engaged also during reverse drive operation to accommodate delivery of reaction torque in a reverse drive direction to the transmission housing. Brake band 50 is applied and released by fluid pressure operated brake servo 54.

Turbine 16 is connected drivably to turbine shaft 56, which in turn is drivably connected to the torque input side of each of the clutches 32 and 30. When clutch 30 is applied, shaft 56 becomes connected drivably to the ring gear 36 of the gear unit 26. Shaft 56 becomes connected to the sun gear 34 whenever clutch 32 is applied. The connection between the torque output side of the clutch 32 and the sun gear 34 is completed by a drive shell 58 which encircles gear unit 26 and the clutch 30.

Clutch 30 is applied and released by a fluid pressure operated servo which includes annular piston 60. Clutch 32 is applied and released by a fluid pressure operated servo which includes piston 62. The torque output side of the clutch 32 defines a brake drum about which is positioned a second or intermediate speed ratio brake band 64. This brake band is applied and released by a double-acting fluid pressure operated servo 66 having a piston 68. The piston cooperates with a cylinder to define a pair of opposed working chambers on either side of the piston. When both chambers are pressurized, the brake is released. When the left-hand fluid pressure working chamber of the servo 66 is pressurized and the right-hand fluid pressure chamber is exhausted, the brake becomes applied.

A compound fluid pressure governor 70 is connected drivably to torque output shaft 72. The governor senses the speed of rotation of the torque output shaft and supplies a fluid pressure signal that is related in magnitude to the driven speed of the mechanism. Output shaft 72 in turn is connected directly to the ring gear 42 of gear unit 28 and to the carrier 38 of the gear unit 26.

Shaft 72 is connected to road wheels 74 through a suitable driveline and differential-and-axle asembly.

The gearing arrangement shown in FIG. 1 is capable of establishing three forward drive speed ratios and a single reverse speed ratio. The first forward driving speed ratio is obtained by applying clutch 30. Clutch 30, which remains applied during operation in each of the forward driving ratios, connects the turbine shaft 56 to the ring gear 36. Since carrier 38 is connected to the driven member, it resists rotation due to the driving input torque acting on the ring gear 36. This causes a reverse torque to be imparted to the sun gear 34. This reverse torque causes forward driving motion of the ring gear 42 of the second planetary gear unit 28. As the carrier 44 acts as a reaction member, reaction torque on the carrier 44 is distributed through the overrunning brake 52 to the transmission housing. Ring gear 42 then is driven in a forward driving direction, its driving torque complementing the driving torque of the carrier 38.

Intermediate speed ratio operation is accomplished by engaging brake band 64 as the clutch 30 remains applied. Brake band 64 then anchors the sun gear 34. With the ring gear 36 being driven by the shaft 56 and with the sun gear 34 acting as a reaction member, carrier 38 and the output shaft 72 are driven at a decreased speed ratio less than the low speed ratio but greater than unity.

Direct drive operation is achieved by disengaging the brakes and by engaging simultaneously both clutches. This locks together the elements of the gearing for rotation in unison at a 1:1 ratio.

Reverse drive is accomplished by engaging brake band 48, releasing brake band 64, applying clutch 32 and releasing clutch 30. Turbine torque in shaft 56 then is distributed to the clutch 32 to the sun gear 34. With the carrier 44 acting as a reaction member, sun gear 34 drives the ring gear 42 in a reverse direction thereby imparting reverse motion to shaft 72.

Figure 2:
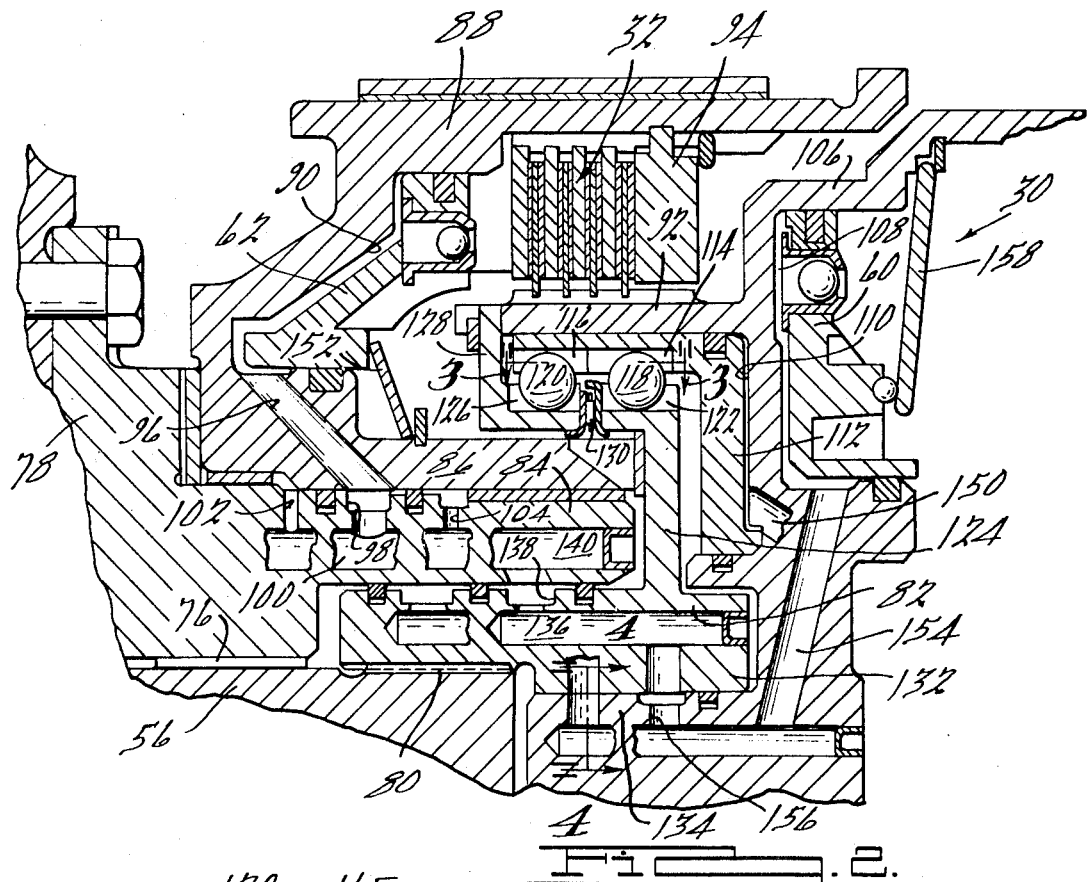
FIG. 2 is a cross-sectional view of a portion of the friction clutch used in a gearing arrangement of the type shown in FIG. 1.

In FIG. 2 we have shown the complete assembly for clutch 32. The input shaft 56, shown at FIG. 2, is journalled by means of bearing 76 in an opening formed in forward wall 78 of the transmission housing. The end of shaft 56 is splined at 80 to a torque input clutch member 82 located within stationary sleeve 84 carried by the housing wall 78. Sleeve 84 provides a bearing support for the hub 86 of brake drum 88. The drum 88 includes annular cylinder 90 within which is slidably positioned the clutch servo piston 62. Piston 62 is adapted to act directly upon the discs of the disc clutch 32. Alternate discs of clutch 32 are splined to the inner periphery of the drum 88, and companion discs register with them. These are splined to inner clutch member 92. A reaction ring 94 carried by the drum 88 provides a reaction paint for the fluid pressure forces acting on the piston 62 as the clutch 32 is engaged. The hub 86 of the drum 88 is provided with a pressure inlet passage 96, which registers with annular groove 98 formed in the sleeve 84. A fluid pressure delivery passage shown in part at 100 is formed in the sleeve 84 and in the housing 78 for supplying fluid to the annular groove 58 and to the fluid pressure working chamber defined by the piston 62 and cooperating annular cylinder 90.

Figure 3:
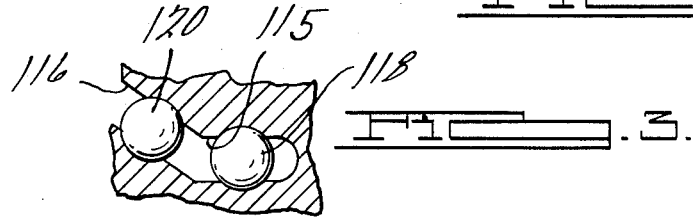
FIG. 3 shows a subassembly view in cross-section as seen from the plane of section line 3—3 of FIG. 2.

Bearing lubrication ports 102 and 104 also are formed in the sleeve 84 for directing lubricating fluid to the adjacent bearings that support the drum 88. The forward drive clutch 30 comprises a clutch drum 106 which forms an annular cylinder 108 for receiving the clutch servo piston 60. Clutch member 92 forms a part of the drum 106. The drum 106 and the cooperating clutch element 92 define an annular cylinder 110 which serves as a reaction pressure cylinder for receiving reaction piston 112, the latter being of annular form with an outer peripheral margin 114. The inner surface of the margin 114 is formed with cam recesses which are best seen by referring to FIG. 3. The recesses are elongated and are formed in two segments identified separately by reference characters 115 and 116. The ends of the segments intersect. The disposition of the segment 115 is generally axial and the disposition of the segment 116 with respect to the segment 115 is angular so that the segments form an acute angle as indicated in FIG. 3. Each segment registers with a cam ball as shown at 118 and 120, respectively. Ball 118 registers with a cam groove 122 formed in the outer margin of radially disposed cam element 124. Groove 122 is generally parallel to the cam recess segment 115. Cam ball 120 registers with cam recess 126 formed in cam element 128. Cam element 128 is connected directly to clutch member 92 and rotates with it. A suitable thrust bearing, preferably a radial needle thrust bearing, is disposed between adjacent surfaces of the cam element 124 and cam element 128 as shown at 130 thereby reducing friction as one cam element moves with respect to the other.

Cam element 124 is driven by torque input shaft 56, and driving input torque is transferred through the cam ball 118, through the margin 114 of the piston 112, through the cam ball 120 and through the cam element 128 to the clutch member 92. All of the input torque for both clutches 30 and 32 is distributed through the cam mechanism in this fashion.

As torque is delivered to the cam balls 120, an axially directed reaction force will be imposed upon the reaction piston 112 thereby causing it to shift slightly in an axial direction. When the driving torque on the shaft 56 is in a forward direction, the reaction torque on the piston 112 tends to shift it in a right-hand direction, as viewed in FIG. 2. This is accompanied by slight angular displacement of the cam element 124 with respect to the clutch drum 106.

Cam ball 118 is capable of accommodating axial displacement of the piston 112 by reason of the rolling action that takes place upon application of driving torque.

Figure 4:
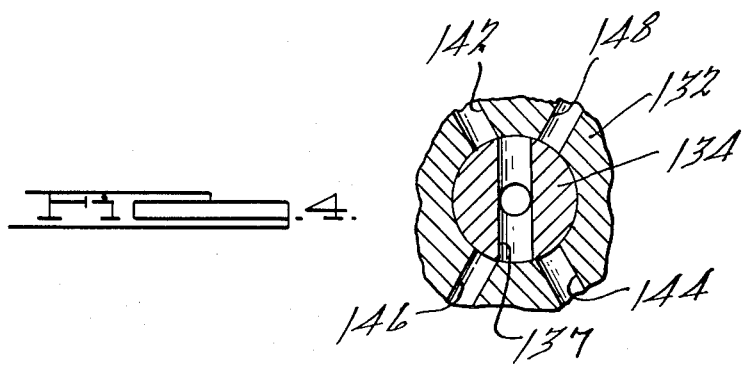
FIG. 4 is a cross-sectional view taken along the plane of section line 4—4 of FIG. 2.

The hub of cam element 124 forms a cylindrical valve member 132. A circular valve member 134 is disposed within the member 132, as indicated best in FIG. 4. Cam element 124 is provided with a high pressure supply passage 136 which is in fluid communication with annular groove 138. This groove in turn is in communication with high pressure supply passage 140 through a radially disposed port. Passage 140 in turn communicates with the discharge side of the pump 24.

High pressure supply passage 136 communicates with a pair of control pressure ports 142 and 144 in the valve member 132. Valve member 134 is provided with radial port 137.

Upon relative rotation of the valve members 132 and 134, the degree of communication between radial port 137 and each of the ports 142 and 144 progressively increases. Simultaneously the degree of communication established between port 137 and exhaust ports 146 and 148 in member 132 is decreased. Angular movement of member 132 with respect to member 134 is accompanied by axial displacement of the piston 112.

Port 137 communicates with passage 150 formed in clutch drum 106. This passage communicates with reaction pressure chamber 110, thereby opposing the reaction force acting on the piston 112. Rotary displacement of valve member 132 with respect to valve member 134 then is accompanied by a reaction force on the piston 112 which tends to return the piston to the original position as it opposes the motion of cam element 124 with respect to cam element 128.

If the driving torque is increased, the displacement of the piston 124 tends to increase, which in turn results in an increase in regulated pressure in the chamber 110. Conversely, a reduced driving torque will result in a reduced pressure in the chamber 110. Passage 150 then may be arranged in fluid communication with the control valve circuit mentioned in the preceding general description and utilized as an indicator of driving torque. This pressure signal then is obtained without reference to the magnitude of the engine intake manifold pressure. It is related in magnitude directly to the driving torque rather than to a control variable that is only indirectly determined by engine torque.

When the supply of clutch pressure to passage 96 is interrupted, clutch 32 becomes disengaged and Belleville spring 152 anchored on the hub 86 of the drum 88 urges the piston 62 to a released position.

Clutch 30 is applied by introducing control pressure to passage 154 located in clutch member 106. This passage extends to port 156 in the valve member 134, which in turn communicates with passage 136. The fluid pressure acting on the piston 60 produces a clutch engaging force which is transmitted to the friction discs of the clutch 30 through Belleville spring lever 158.

Figures 5, 6:
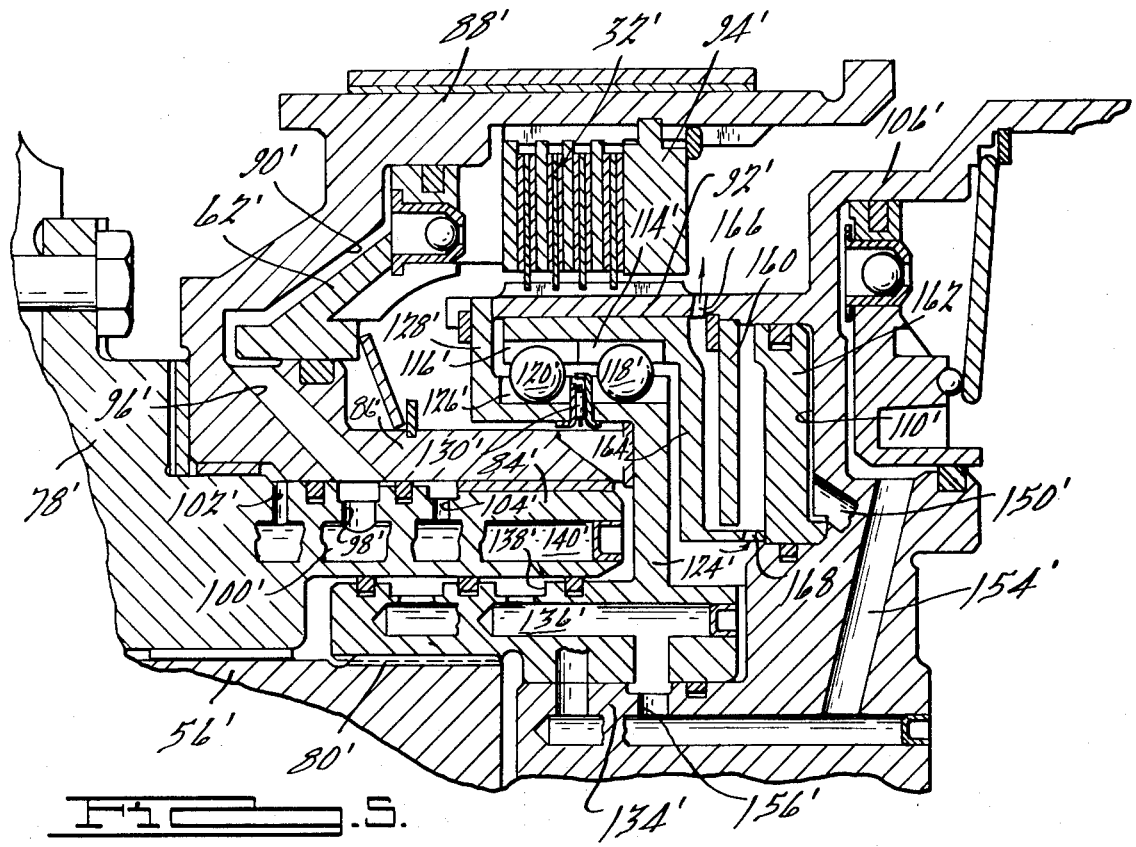
FIG. 5 is a view showing in cross-section a modified clutch similar to the construction of FIG. 2. The clutch includes a centrifuged pressure balancing chamber adjacent the reaction piston.
FIG. 6 shows certain modifications similar to the construction of FIG. 5, but including a modified centrifuged valve pressure balancing chamber.

When the clutch is operated at high speeds, it is possible for cylindrical pressure to develop in the pressure chamber defined by the reaction piston 112. This centrifugal pressure will augment the regulated torque sensor signal, thereby providing an erroneous reading. In order to overcome the influence of centrifugal pressure, we have provided in the embodiment of FIG. 5 a centrifugal pressure balancing dam in the form of an annular disc 160 which engages at its outer periphery the clutch member 92'. With the exception of the construction of the reaction piston and the centrifugal pressure balancing dam of FIG. 5, all the other elements in FIG. 5 are identical to the counterpart elements of FIG. 4. For this reason similar reference characters are used in FIG. 5 to designate the various elements although "prime" notations have been added.

In FIG. 5 the reaction piston includes a first piston portion 162 which is received within annular cylinder 110' formed in clutch member 106'. It engages second piston portion 164 located within the clutch member 92'. Member 164 is formed with camming portions 114' and 116' which are similar to the camming portions formed in the piston 112 of the FIG. 2 embodiment. The inner margin of the piston portion 164 engages the inner margin of the piston 162. The cavity located between the piston portion 164 and the pressure balancing dam 160 is exhausted at its outer margin through exhaust port 166. Lubricating oil accumulates in the annular space located between the dam 160 and the piston 162 through a port 168. As the clutch rotates, a centrifugal pressure that is developed in the annular cylinder 110' is counter-balanced by a corresponding build-up in centrifugal pressure in the annular cavity on the left-hand side of the piston 162. This net force acting on the piston 162 is due to the centrifugal action then is approximately zero.

In the embodiment of FIG. 6 the centrifugal pressure balancing chamber is defined by the cam element 124" and the piston 112". Cam element 124" is provided with a peripheral extension 170 which carries a sealing ring that engages an inner cylindrical surface 172 of the piston 112". The centrifugal pressure balancing chamber defined by the cam element 124" and the piston 112" is identified by reference character 174. The other elements of the FIG. 6 construction have counterpart elements in the FIG. 2 construction, and for this reason similar reference characters are used although "double prime" notations are added.

Having thus described preferred forms of our invention, what we claim and desire to secure by U.S. Letters Patent is:

1. A friction clutch adapted to be used in a torque transmitting mechanism for transferring driving torque from a driving member to a driven member comprising a clutch torque input member, a clutch torque output member, friction clutch elements carried by said clutch members, a clutch servo cylinder carried by one of said members, a clutch servo piston in said cylinder and cooperating therewith to define a clutch pressure chamber which when pressurized causes a piston force that frictionally engages said friction elements, a pair of relatively movable valve members having registering valve ports, one valve member being connected to said driving member, the other valve member being connected to the torque input side of said friction clutch, a first cam member, a second cam member connected to the torque input side of said clutch, one cam member registering with the other and adapted to produce an axial force component when torque is delivered from one cam member to the other, means for transferring torque from said driving member to said first cam member, a reaction cylinder formed in said one clutch member, a reaction piston in said reaction cylinder defining therewith a reaction pressure chamber, a pressure outlet port in one of said valve members communicating with said reaction chamber, means for supplying control pressure to the registering valve port in the other of said valve members, said valve members upon movement of one with respect to the other providing controlled communication between said ports upon displacement of one cam member with respect to the other and means for transferring the axial force component from said one cam member to said reaction piston thereby opposing the pressure force acting on said reaction piston.

2. The combination as set forth in claim 1 wherein said one cam member is a helical groove, a second groove in said other cam member in registry with said first-named helical groove, a cam ball element registering with said grooves whereby torque may be transmitted from one cam member to the other whereby an axial thrust component upon said one cam member is developed and wherein the magnitude of that thrust component is proportional to the torque delivered through said mechanism, said axial thrust component being opposed by the reaction force produced by the pressure in said reaction chamber whereby the pressure in said reaction chamber is an indicator of the torque delivered through said mechanism.

3. The combination as set forth in claim 1 wherein the connection between said one valve member and said driving member includes a radial extension connected to said one valve member, another axial groove in said extension, a groove in said one cam member, a torque transmitting ball registering with said axial grooves and adapted to transmit torque from said driving member to said one cam member while accommodating axial displacement of said one cam member.

4. The combination as set forth in claim 2 wherein the connection between said one valve member and said driving member includes a radial extension connected to said one valve member, another axial groove in said extension, an axial groove in said one cam member, a torque transmitting ball registering with said axial grooves and adapted to transmit torque from said driving member to said one cam member while accommodating axial displacement of said one cam member.

5. The combination as set forth in claim 1 wherein said reaction piston cooperates with other elements of said mechanism to define a reaction pressure chamber on the side thereof that is opposite to the side on which said reaction pressure chamber is situated whereby fluid is allowed to collect therein and to develop a centrifugal pressure that opposes centrifugal pressure build-up in said clutch pressure chamber due to rotation of the mechanism.

6. The combination as set forth in claim 2 wherein said reaction piston cooperates with other elements of said mechanism to define a reaction pressure chamber on the side thereof that is opposite to the side on which said reaction pressure chamber is situated whereby fluid is allowed to collect therein and to develop a centrifugal pressure that opposes centrifugal pressure build-up in said clutch pressure chamber due to rotation of the mechanism.

7. The combination as set forth in claim 3 wherein said reaction piston cooperates with other elements of said mechanism to define a reaction pressure chamber on the side thereof that is opposite to the side on which said reaction pressure chamber is situated whereby fluid is allowed to collect therein and to develop a centrifugal pressure that opposes centrifugal pressure build-up in said clutch pressure chamber due to rotation of the mechanism.

8. The combination as set forth in claim 4 wherein said reaction piston cooperates with other elements of said mechanism to define a reaction pressure chamber on the side thereof that is opposite to the side on which said reaction pressure chamber is situated whereby fluid is allowed to collect therein and to develop a centrifugal pressure that opposes centrifugal pressure build-up in said clutch pressure chamber due to rotation of the mechanism.

References Cited
UNITED STATES PATENTS

| | | | |
|---|---|---|---|
| 2,642,971 | 6/1953 | Hagenbook | 192—56 F |
| 2,946,241 | 7/1960 | Snyder | 74—751 X |
| 3,237,734 | 3/1966 | Jania | 192—56 F X |
| 3,360,087 | 12/1967 | Hilpert | 192—56 F |
| 3,537,553 | 11/1970 | Olsen | 192—3.33 |

BENJAMIN W. WYCHE, Primary Examiner

U.S. Cl. X.R.

74—731; 192—56 F, 106 F; 91—59